United States Patent [19]
Takamoto et al.

[11] Patent Number: 5,914,582
[45] Date of Patent: Jun. 22, 1999

[54] PERMANENT MAGNET SYNCHRONOUS MOTOR CONTROLLER AND ELECTRIC VEHICLE CONTROLLER

[75] Inventors: Yuusuke Takamoto; Ryoso Masaki, both of Hitachi; Hiroshi Katada, Hitachinaka; Sanshiro Obara, Toukai-mura, all of Japan

[73] Assignee: Hitachi, Ltd., Tokyo, Japan

[21] Appl. No.: 09/012,560

[22] Filed: Jan. 23, 1998

[30] Foreign Application Priority Data

Jan. 27, 1997 [JP] Japan .................................. 9-012396

[51] Int. Cl.$^6$ ....................................................... H02P 5/34
[52] U.S. Cl. .......................... 318/801; 318/700; 318/724; 318/299
[58] Field of Search .................................. 318/700, 724, 318/801, 299

[56] References Cited

U.S. PATENT DOCUMENTS 4,002,958  1/1977  Akamatsu ............................ 318/801 X

FOREIGN PATENT DOCUMENTS 1-190286   7/1989   Japan .
6-315201   11/1994  Japan .

*Primary Examiner*—Karen Masih
*Attorney, Agent, or Firm*—Evenson, McKeown, Edwards & Lenahan, P.L.L.C.

[57] ABSTRACT

A permanent magnet synchronous motor controller includes an inverter for supplying an alternating current power converted from a direct current power to a three-phase permanent magnet synchronous motor, having a pair of switching elements for each of said three phases of the motor; a smoothing capacitor for smoothing the direct current power connected to the inverter in parallel; and a control unit for controlling the motor by ON-OFF controlling each of the switching elements of the inverter, which further including a short circuit transition processing portion for changing control to 3-phase short circuit after performing precursory ON-OFF control of each of the switching elements so as to avoid occurrence of over current at an initial period of performing the 3-phase short circuit while the motor is being rotated.

14 Claims, 11 Drawing Sheets

20、23、25 : ON
21、22、24 : OFF (FROM TIME TO PREDETEMINED TIME T1)

21、23、25 : ON
20、22、24 : OFF (AFTER PREDETEMINED TIME T1)

(a) STEADY-STATE CURRENT COMPONENT (U-PHASE)

(b) 3-PHASE SHORT-CIRCUIT TRANSIENT CURRENT COMPONENT (U-PHASE)

(a) U-PHASE CURRENT (b) V-PHASE CURRENT (c) W-PHASE CURRENT (d) TORQUE CHARACTERISTIC

COMPENSATING CURRENT
COMPONENT BY PULSE VOLTAGE $iu'' = -i2 \cdot (1-\exp(-t/\tau))$, $\tau = La/Ra$, $i2 = 2Vc/3Ra$

COMPENSATING CURRENT
COMPONENT BY PULSE VOLTAGE
(U-PHASE)

(a) U-PHASE SIGNAL (b) U-PHASE SIGNAL, W-PHASE SIGNAL (a) U-PHASE CURRENT (b) V-PHASE CURRENT (c) W-PHASE CURRENT (d) TORQUE CHARACTERISTIC (a) STEADY-STATE CURRENT COMPONENT (b) 3-PHASE SHORT-CIRCUIT TRANSIENT CURRENT COMPONENT (a) STEADY-STATE CURRENT COMPONENT (U-PHASE)

(b) 3-PHASE SHORT-CIRCUIT TRANSIENT CURRENT COMPONENT (U-PHASE)

PERMANENT MAGNET SYNCHRONOUS MOTOR CONTROLLER AND ELECTRIC VEHICLE CONTROLLER

BACKGROUND OF THE INVENTION

The present invention relates to a controller used for a permanent magnet synchronous motor and an electric vehicle controller using the controller.

A permanent magnet synchronous motor controller is disclosed, for example, in Japanese Patent Application Laid-Open No.6-315201. In a case where control of a permanent magnet synchronous motor is started when the permanent magnet synchronous motor is being rotated at a high speed, or in a case where switching elements of an inverter are in an OFF state under a state in which a rotating speed of the permanent magnet synchronous motor exceeds a controllable range, the input side of the inverter is in a direct current high voltage due to electric generating operation of the permanent magnet synchronous motor. If a battery and the inverter are connected by a relay circuit under such a condition in order to start or restart the control of the permanent magnet synchronous motor, overcharge of the battery will occur. Therefore, in the above prior art, a contactor for breaking the connection between the inverter and the permanent magnet synchronous motor is provided, and the connection between the inverter and the permanent magnet synchronous motor is broken when the power supply to a pre-drive circuit for driving switching of the inverter is cut in order to avoid the high voltage condition in the input side of the inverter due to electric generating operation of the permanent magnet synchronous motor.

In the prior art of Japanese Patent Application Laid-Open No.6-315201, there is a problem in that the cost is high and the weight is increased since the contactor is used.

Further, Japanese Patent Application Laid-Open No.1-190286 discloses a technology where stop maintaining control is performed by 3-phase short circuiting of at least two of three switching elements connected to a negative pole side of a direct current power source among six switching elements of an inverter at the same time to generate a braking force in a permanent magnet synchronous motor.

The technology disclosed in Japanese Patent Application Laid-Open No.1-190286 is for control during stopping of a vehicle and not for control during running operation. Therefore, there still remains a problem in that when the 3-phase short-circuit is performed while the permanent magnet synchronous motor is being rotated at a high speed, a large current flows from the motor to the switching elements of the inverter at an initial stage of the short circuit (transiently). If switching elements having a large maximum allowable current are employed, the cost is increased.

Here, explanation will be made below on a case where the 3-phase short circuit is required in a permanent magnet synchronous motor controller performing ON-OFF control operation.

The control of a 3-phase short circuit can be performed by outputting signals to turn on all switching elements 20, 22, 24 connected to a positive pole side of a direct current power source and to turn off all switching elements 21, 23, 25 connected to a negative pole side of the direct current power source from a controller 11. By the control, currents of 3-phase terminals of a motor 1 flow through the switching elements 20, 22, 24 and the corresponding diodes, and consequently the 3-phase terminals of the motor 1 are physically coupled.

Therein, the 3-phase short circuit can be attained by turning on the switching elements 21, 23, 25 and turning off the switching elements 20, 22, 24.

However, when the 3-phase short circuit is simply performed, there occurs the following problem. FIG. 10 is a series of charts explaining motor currents and motor torque when 3-phase short circuit control is performed. The figure shows motor currents and motor torque when 3-phase short circuit control is performed by turning on the switching elements 20, 22, 24 at a time at "time 0" without any additional operation while the switched elements 21, 23, 25 are being kept switching off. FIG. 10 (a), FIG. 10 (b), FIG. 10 (c) and FIG. 10 (d) show U-phase current, V-phase current, W-phase current and torque characteristic, respectively.

The characteristics shown here illustrate that the U-phase current flows are largely shifted to the positive side and the V-phase current and the W-phase current flows are shifted to the negative side in the initial period, and then all the currents in the U-phase, the V-phase and the W-phase are settled to sinusoidal waves having a center of a 0 (zero) current value after sufficient time elapses. During that time period, torque fluctuation in connection to the fluctuation also occurs in the motor torque. The characteristic of the shift in the motor currents at the starting of the 3-phase short circuit control changes depending on a position of the magnetic pole of the permanent magnet at a starting point of the 3-phase short circuit as the V-phase current is shifted most or the W-phase current is shifted most, or the current is shifted to the positive side or the current is shifted to the negative side.

The shifting phenomenon in the conventional technology will be further explained below, referring to FIG. 11 and FIG. 4. FIGS. 11a and 11b are diagrams explaining a motor equivalent circuit of FIG. 10. FIGS. 4a and 4b are charts explaining motor current time characteristics at the short circuit control.

That is, FIG. 11 (a) is a diagram showing an equivalent circuit of the permanent magnet synchronous motor while performing the 3-phase short circuit. In the figure, the reference character Ra is an armature winding resistance, the reference character La is an armature winding self-inductance, and eu, ev and ew are induced voltages by the permanent magnet. The current flowing in the equivalent circuit of FIG. 11 (a) (called a steady-state current component) is shown in FIG. 4 (a). FIG. 11 (b) is a diagram showing an equivalent circuit of the permanent magnet synchronous motor subtracting the induced voltage by the permanent magnet. The current flowing in the equivalent circuit of FIG. 11 (b) (called a transient current component) is shown in FIG. 4 (b). The current while performing the 3-phase short circuit can be expressed as the sum of the steady-state current component of FIG. 4 (a) and the transient current component of FIG. 4 (b).

The steady-state current component of FIG. 4 (a) is a current characteristic (sinusoidal wave having an amplitude i1) of one phase (U-phase) when sufficient time elapses after starting the 3-phase short circuit. The induced voltage eu is generated with a phase leading the current by nearly 90° if the frequency of the current is very high, though it is not shown. The current shift at the starting of the 3-phase short circuit is varied depending on what phase of the steady-state current component the timing of the starting the 3-phase short circuit is started at.

That is, referring to the steady-state current component of FIG. 4 (a), in a case where the 3-phase short circuit control is started at a timing of a phase at time point (1), the current begins to flow without shifting to the positive side nor to the negative side. In a case where the 3-phase short circuit is started at a timing of a phase at time point (2), the current begins to flow with shifting to the switching element connected to the negative side. In a case where the 3-phase short circuit is started at a timing of a phase at time point (3) (in the case corresponding to the figure of FIG. 10 (a)), the current begins to flow with shifting to the switching element connected to the positive side.

This is because the current before starting the 3-phase short circuit is 0 (zero), and the current is started to flow from 0 (zero) to the negative side when the 3-phase short circuit is started at a timing of a phase at time point (2), and then the current flows twice as much as the amplitude of the sinusoidal wave. Similarly, the current is started to flow from 0 (zero) to the positive side when the 3-phase short circuit is started at a timing of a phase at time point (3), and then the current flows twice as much as the amplitude of the sinusoidal wave. Therefore, when the 3-phase short circuit is started at a timing of a phase at time point (1), there is no shift in one phase (U-phase). However, since the V-phase and the W-phase are behind the U-phase by 120° and 240° respectively, it is impossible to eliminate all shifts in the three-phase.

On the other hand, the transient current component of FIG. 4 (b) indicates the shift of current at starting the 3-phase short circuit. The value iu' is a shifting current component (3-phase short circuit transient current component) of the U-phase, and decays with a time constant τ expressed by the following equation.

$$\tau = La/Ra \qquad (1)$$

Similarly, 3-phase short circuit transient components of the V-phase and the W-phase decay with a time constant τ.

The 3-phase short circuit transient current component iu' can be expressed as Equation (2).

$$iu' = iu'0 \cdot exp(-1/r) \qquad (2)$$

The initial value iu'0 of the decay curve is a reversed sign value of the phase current value at the starting of the 3-phase short circuit in the steady-state current component of FIG. 4 (a). That is, the initial value iu'0 is −i1 when the 3-phase short circuit is started at the timing of the phase (2), and the initial value iu'0 is i1 when the 3-phase short circuit is started at the timing of the phase (3). Similarly, each of the initial values of the 3-phase short circuit transient current components for the V-phase and the W-phase is a reversed sign value of the corresponding phase current value at starting of the 3-phase short circuit in the steady-state current component.

When the current flowing at the starting of the 3-phase short circuit exceeds a maximum allowable current value of the switching element (IGBT or the like), there is a possibility that the switching element is broken. Further, it may be considered that the motor torque is fluctuated as shown in FIG. 10 (d) to adversely affect the driving system (gears or the like).

SUMMARY OF THE INVENTION

An object of the present invention is to provide a permanent magnet synchronous motor controller and an electric vehicle controller which can avoid the occurrence of an over-current and can reduce the cost.

The present invention is characterized by a permanent magnet synchronous motor controller comprising an inverter for supplying an alternating current power converted from a direct current power to a 3-phase permanent magnet synchronous motor through switching elements provided for each of the phases; a smoothing capacitor for smoothing the direct current power supplied to the inverter; and a control unit for controlling the inverter by performing an ON-OFF control of each of the switching elements, wherein the control unit comprises a short circuit transition means for performing precursory ON-OFF control of each of the switching elements prior to performing ON-OFF control of the 3-phase short circuit by the control unit during rotation of the permanent magnet synchronous motor and then performing the 3-phase short circuit.

Further, the present invention is characterized in that the inverter is constructed in a 3-phase bridge by at least six of the switching elements, and the short circuit transition means turns on one phase or two phases of the switching elements connected to a positive pole side of a direct current power source for supplying the direct current power to the inverter and the other phases of the elements connected to a negative pole side of the direct current power source at a certain timing determined by a state of the motor when all of the switching elements are in an OFF state, and then performs the 3-phase short circuit by switching the ON-OFF states of the switching elements after a required time period for suppressing a transient current.

Furthermore, the present invention is characterized by a permanent magnet synchronous motor controller for switching a three-phase permanent magnet synchronous motor rotating from a free run state to a driven state by an inverter, wherein switching control for canceling out transient current accompanied by 3-phase short circuit by the inverter from a certain time point determined by a magnetic pole position of the permanent magnet synchronous motor.

Further, an electric vehicle controller to attain the above-mentioned object operates using the above-mentioned permanent magnet synchronous motor controller.

Furthermore, the electric vehicle controller may comprise a phase selecting means for selecting a phase of a switching element in which a transient current component generated by a generated electric power of the permanent magnet synchronous motor when switching operation of the three-phase rotating permanent magnet synchronous motor is suddenly stopped; and a canceling-out means for controlling so as to cancel out the transient current component by applying an accumulated electric power of the smoothing capacitor to the selected phase for a required time period.

According to the present invention, an occurrence of over current can be prevented since the 3-phase short circuit is performed after the precursory control is executed during rotation of the permanent magnet synchronous motor. That is, the 3-phase short circuit process at re-starting while the permanent magnet synchronous motor is being rotated at a high speed can be performed without allowing over current to flow through the switching elements at an initial period of the 3-phase short circuit. Thereby, there is an effect in that breakage of the switching elements can be prevented and the safety of the permanent magnet synchronous motor controller at high speed rotation can be improved.

BRIEF DESCRIPTION OF THE DRAWINGS

FIG. 3 (b) is a circuit diagram explaining the operation of the short circuit control in the embodiment of FIG. 1.

DESCRIPTION OF THE PREFERRED EMBODIMENTS

Embodiments of the present invention will be described below, referring to the accompanying drawings.

Figure 1:
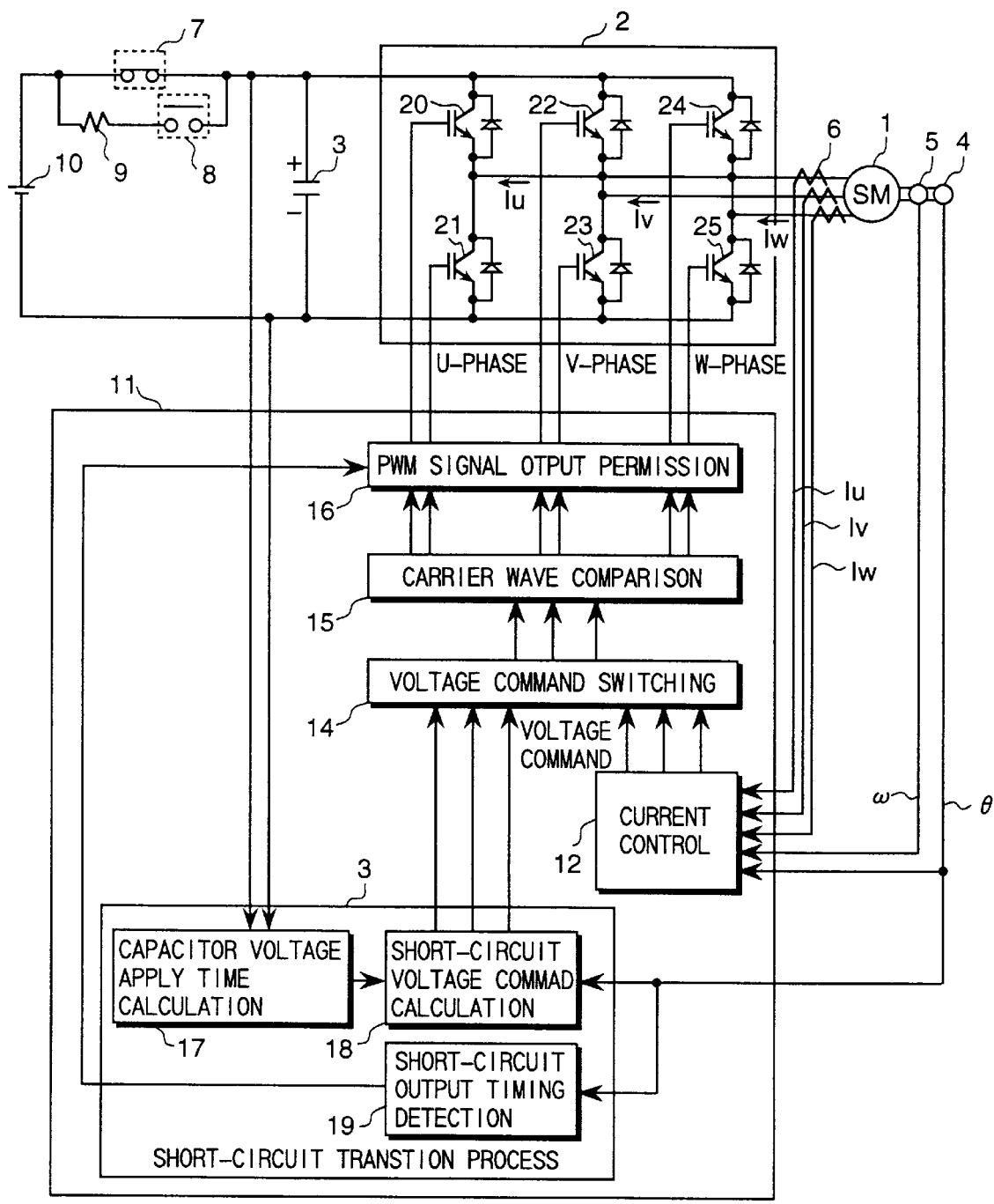
FIG. 1 is a diagram showing an embodiment of a permanent magnet synchronous motor controller in accordance with the present invention.

FIG. 1 is a diagram showing an embodiment of a permanent magnet synchronous motor controller (hereinafter, also referred to simply as "controller") in accordance with the present invention. The permanent magnet synchronous motor controller of this embodiment comprises an inverter 2 for supplying an alternating current power to a permanent magnet synchronous motor 1 (hereinafter, also referred to simply as "motor 1"), a smoothing capacitor 3 (hereinafter also referred to as "capacitor 3") and a control unit 11. The controller further comprises a magnetic pole position sensor 4 for detecting a magnetic pole position, an encoder 5, current sensors 6, a main relay 7, an auxiliary relay 8, a resistor 9 and a battery 10.

The control unit 11 is composed of a current control portion 12, a short circuit transition process portion 13, a current command switching portion 14, a carrier wave comparison portion 15, a PWM signal permission portion 16 and so on. The control unit 11 further comprises a function for performing ON-OFF control of the main relay 7 and the auxiliary relay 8. The control unit may be composed of a microcomputer and a program for executing processes of various kinds of functions.

Here, explanation will be made on a method of controlling the permanent magnet synchronous motor by the permanent magnet synchronous motor controller of the present embodiment below. That is, explanation will be made on a method of controlling an electric power supplied to the motor by ON-OFF control of the switching elements of the inverter and control of the speed and torque of the permanent magnet synchronous motor.

The control unit 11 initially charges electricity from the battery 10 to the capacitor 3 by turning on the auxiliary relay 8 as a preparing process before starting switching control of the inverter 2. At that time, the main relay 7 is kept turned off. The maximum value of charging current to the capacitor 3 can be suppressed by the resistor 9 to protect burn-out of the relays and the wiring. When the voltage of the capacitor 3 becomes equal to the voltage of the battery 10, the main relay 7 is turned on, and the auxiliary relay 8 is turned off.

After making the main relay 7, the control unit 11 starts to perform the process of the current control portion 12, and outputs the resultant 3-phase (U-phase, V-phase, W-phase) voltage command values to the inverter 2 as PWM signals. In the current control portion 12, the voltage commands are calculated by respectively comparing torque component currents and exiting component currents obtained from current values output from the current sensor with torque component current commands and exiting component current commands. Current commands are calculated by vector control using a torque command, a motor rotating speed and so on.

In an electric vehicle controller, the torque command is calculated from an acceleration opening and so on. The torque command may be also obtained by calculating motor speed control. A magnetic pole position necessary for the current control is calculated based on a signal from the magnetic pole position sensor 4 of magnetic pole position detecting means. The motor rotating speed is calculated from pulses output from the encoder 5.

The voltage command switching portion 14 selects the voltage commands obtained by the current control and outputs them to a carrier wave comparing portion 15. The carrier wave comparing portion 15 compares the 3-phase voltage commands with carrier waves to form the PWM signals. Therein, a timer portion contained in the microcomputer may be used as the carrier wave comparing portion 15. The PWM signal output permission portion 16 prohibits or permits the output of the PWM signals to the gate portions of the inverter 2. The PWM signal output permission portion 16 performs switching operation of the inverter by the PWM signals if PWM signal output is permitted, and turns off all the switching elements if the PWM signal output is prohibited.

An in-microcomputer mounted PWM signal output stop function contained in the control unit 11 (or separately in the controller itself) may be used instead of the PWM signal output permission portion 16, or the PWM signal output permission portion 16 may be replaced by an external circuit which executes AND functions of an output permission control signal from the microcomputer and the PWM signals.

When a rotating speed of the motor is increased and exceeds a controllable range, the control unit 11 stops operation of the current control portion 12, and prohibits the output of the PWM signals by the PWM signal output permission portion 16 to turn off all the switching elements 20, 21, 22, 23, 24, 25 of the inverter 2. At that time, the induced voltage of the motor 1 appears in the input side of the inverter 2 through the diode circuit of the inverter 2.

Therefore, in order to prevent over charging of the battery 10 by the induced voltage of the motor 1, the control unit 11 performs control to separate the battery 10 and the inverter 2 by turning off the main relay 7. That is, the control unit 11 performs short circuit control of the three phase terminals of the motor 1 (control called as "3-phase short circuit") so as to be able to re-make each of the relays without the induced voltage appearing in the input side of the inverter 2. Then, the auxiliary relay 8 is made and the main relay 7 is made while the 3-phase short circuit is being performed, and operation of the current control portion 12 is re-started after the rotating speed of the motor is decreased to the controllable range by braking operation of the 3-phase short circuit.

Further, the following case also requires the control of the 3-phase short circuit processing.

When a control power source, not shown, of the control unit 11 of the controller is turned off by an unexpected reason while the motor 1 is being rotated at a high speed, for example, while the electric vehicle is running, in other words, when ON-OFF control is suddenly stopped, the main relay 7 and the auxiliary relay 8 are turned off as a consequence of the stoppage of the control unit 11 to turn off all the switching elements of the inverter 2. Then, when an operator of the controller (a driver of the electric vehicle) switches on the control power source according to the ordinary way to re-start the controller by making the auxiliary relay 8, burn-out of the relay circuit (the circuit of the main relay 7, or the circuit including the main relay 7 and the auxiliary relay 8) or over charging of the battery is caused because a high induced voltage is produced in the input side of the inverter 2. Therefore, in order to improve the reliability, it is necessary to perform the control processing of the 3-phase short circuit of the motor 1 prior to making the relays.

The control of the 3-phase short circuit is performed in such a manner that the control unit 11 performs the 3-phase short circuit by outputting signals to turn on each of the switching elements 20, 22, 24 connected to one side, that is, for example, the positive pole side of the direct current power source, at a time and to keep in an off state each of the switching elements 21, 23, 25 connected to the negative pole side of the direct current power source. Otherwise, the control unit 11 performs the 3-phase short circuit by outputting signals to turn on each of the switching elements 21, 23, 25 at a time and to keep in an off state each of the switching elements 20, 22, 24. By doing this control, currents of the three phase terminals of the motor 1 flow through all the switching elements 20, 22, 24 and the corresponding diodes, or through all the switching elements 21, 23, 25 and the corresponding diodes. This is equivalent to that of the three phase terminals of the motor 1 being physically connected.

The control process in accordance with the present invention is characterized in that a transient current component generated at the starting of the 3-phase short circuit when the 3-phase short circuit is performed simply without any additional operation is canceled by flowing current in the motor side based on the accumulated electric power having the smoothing capacitor 3 of FIG. 1.

Figure 2:
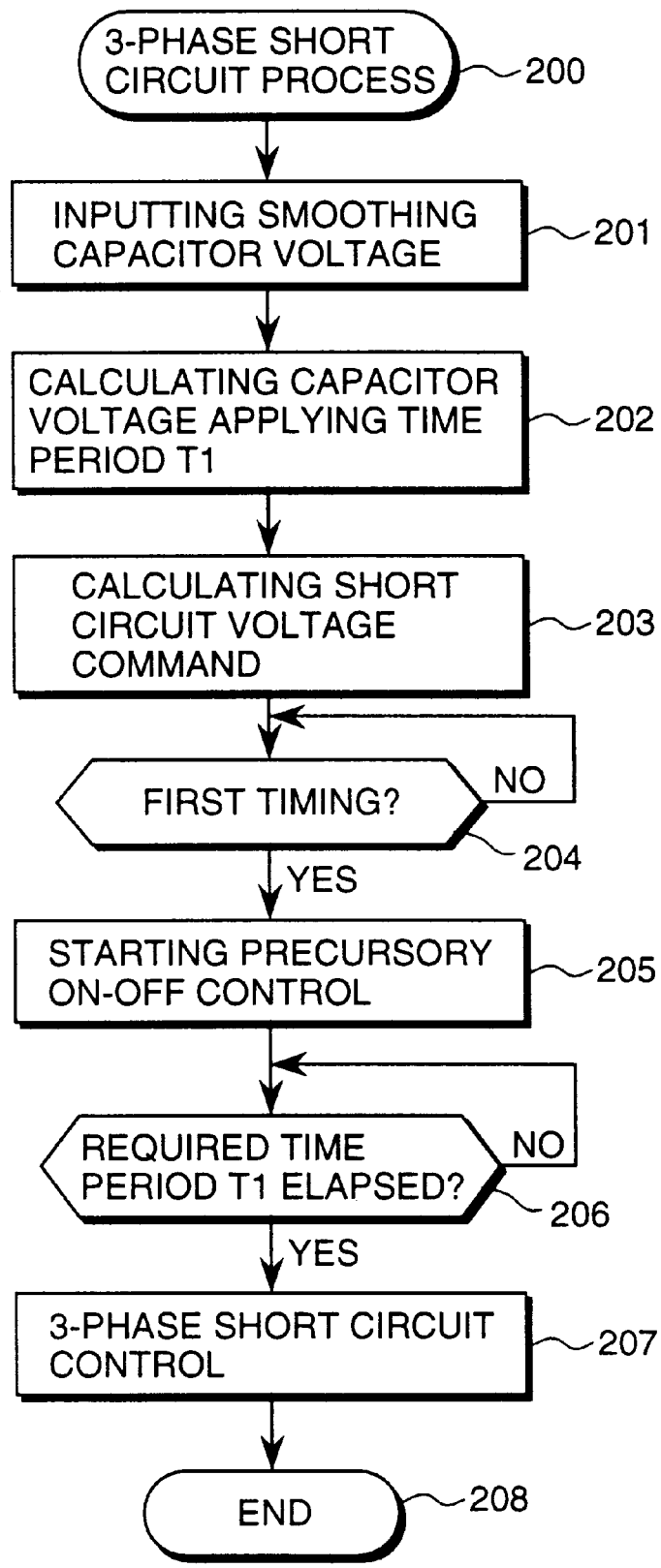
FIG. 2 is a flow chart of the 3-phase short circuit process.

The 3-phase short circuit control process in accordance with the present invention will be described below, referring to the flow chart of FIG. 2.

The control process is performed initially by inputting a voltage of the smoothing capacitor 3 to the capacitor voltage applying time period calculation portion 17 of the short circuit transition processing portion 13 in the control unit 11 (S 201), and then by calculating a capacitor voltage applying time period (a required time period T1 to be described later) (S 202). This is because the magnitude of current to be allowed to flow to the motor 1 is determined by the voltage of the capacitor 3 and a time period to keep the switching elements in the ON state based on the accumulated electricity contained in the capacitor 3. As the applying time period of the capacitor voltage is determined, the short circuit voltage command calculation portion 18 calculates a short circuit voltage command based on the calculated applying time period (S 203). This process is done to calculate the voltage command so as to obtain a required applying time period (pulse width) of the capacitor voltage after comparing with a carrier wave.

Therein, the voltage command switching portion 14 selects the voltage command of the short circuit transition process portion 13. Next, the "first timing" as the certain time point for the precursory ON-OFF control is detected by the short circuit signal output timing detection portion 19 (S 204), and a PWM signal output permission signal is output to the PWM signal output permission portion 16 in order to perform the precursory ON-OFF control (S 205). The short circuit signal output timing detection portion 19 outputs the PWM signal output permission signal by judging the first timing (phase) to apply the capacitor voltage from a magnetic pole position so as to cancel the transient current component by judging in advance a phase in which the largest transient current component will flow. After the required time period T1, elapses the processing proceeds to the 3-phase short circuit control (S 206, S 207).

In order to perform the control process, a capacitor voltage applying time (a required time period T1, to be described later) is calculated in a capacitor voltage applying time calculation portion 17 in the short circuit transition process portion 13 of the control unit 11 by inputting a voltage of the smoothing capacitor 3. This is because a quantity of the current to be conducted to the motor 1 based on the accumulated electric power contained in the capacitor 3 is determined by the voltage of the capacitor 3 and a time period to keep the switching elements in the ON state. As the capacitor voltage applying time is determined, a short circuit voltage command calculation portion 18 executes a calculation of a short circuit voltage command. This calculates the voltage command so as to obtain a capacitor voltage applying time period (pulse width) which is necessary after comparison with a carrier wave.

Therein, the voltage command switching portion 14 is assumed to be a portion for selecting the voltage command of the short circuit transition process portion 13. Next, a short circuit signal output timing detecting portion 19 detects a "first timing" as a certain time point for the precursory ON-OFF control, and outputs a PWM signal output permission signal to the PWM signal output permission portion 16. The short circuit signal output timing detecting portion 19 outputs the PWM signal output permission signal by judging the first timing (phase) to apply the capacitor voltage from a magnetic pole position so as to cancel the transient current component by judging a phase through which a large transient current component will flow in advance.

Figure 3A:
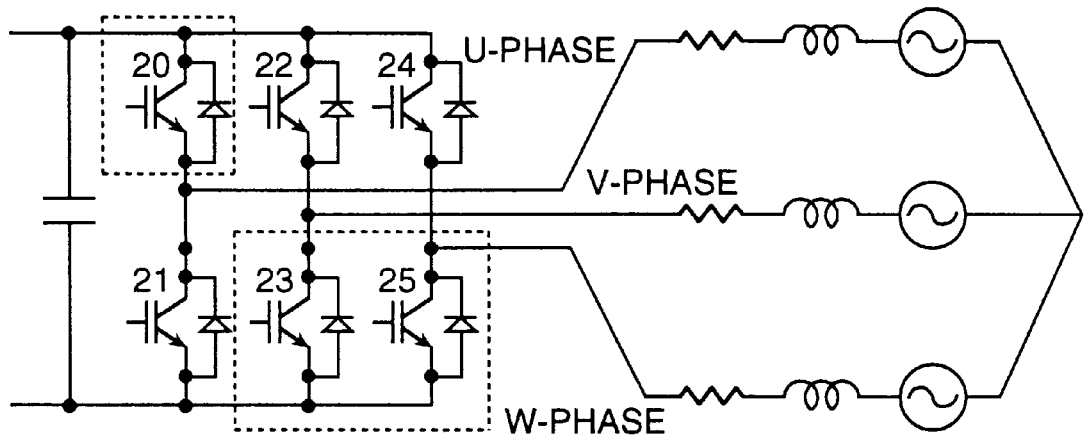
FIG. 3 (a) is a circuit diagram explaining the operation of the short circuit control in the embodiment of FIG. 1.
Figure 3B:
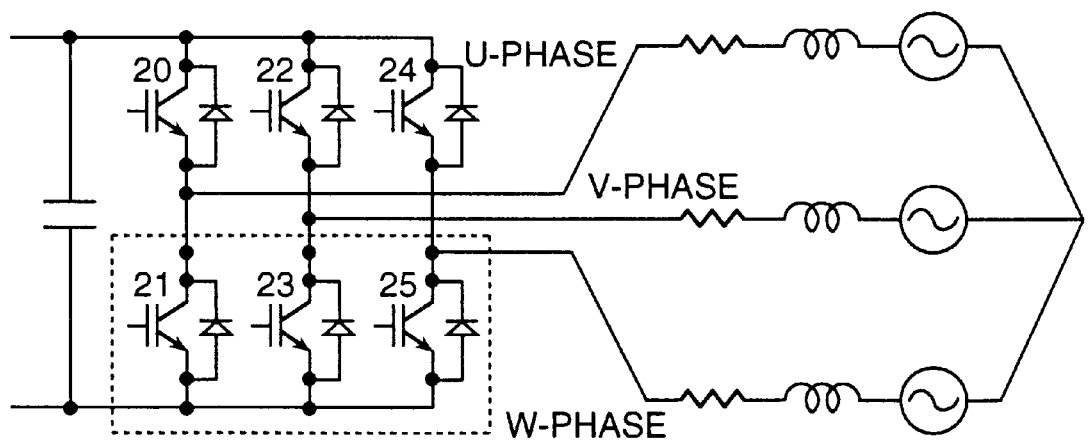

A description will be made below on the operation of the present embodiment in a case where the most large transient current component flows in the U-phase as in FIG. 10, referring to FIG. 3 (a) and FIG. 3 (b). At a timing of time t0 to be described later, the switching elements 20, 22, 24 are turned on and the other switching elements 21, 23, 25 are turned off, as shown in FIG. 3 (a). Next, at the time after a required time period T1, elapses, the on/off states of the switching elements in the U-phase are exchanged, as shown in FIG. 3 (b). That is, the switching element 20 is turned off and the switching element 21 is turned on. By doing so, the motor 1 is 3-phase short circuited since all the switching elements in the negative pole side of the direct current power source are in the ON state.

Figure 6:
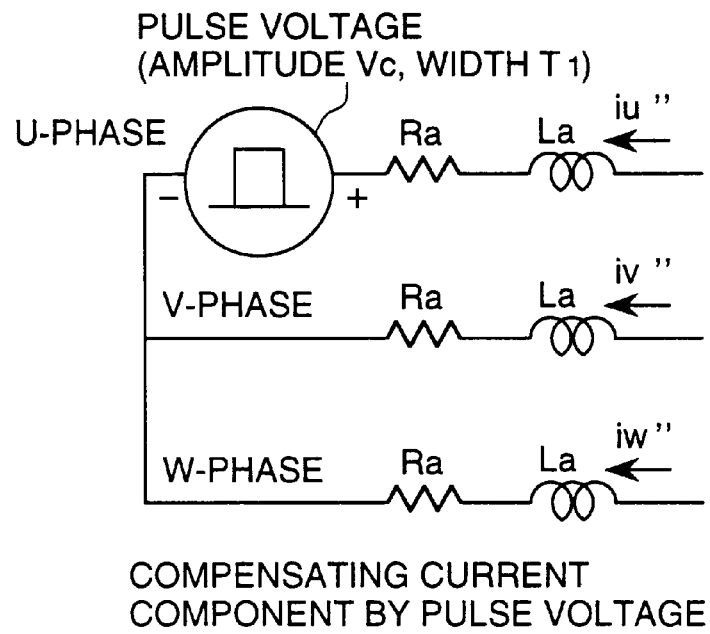
FIG. 6 is a diagram showing a motor equivalent circuit in the case of FIG. 5.
Figure 11:
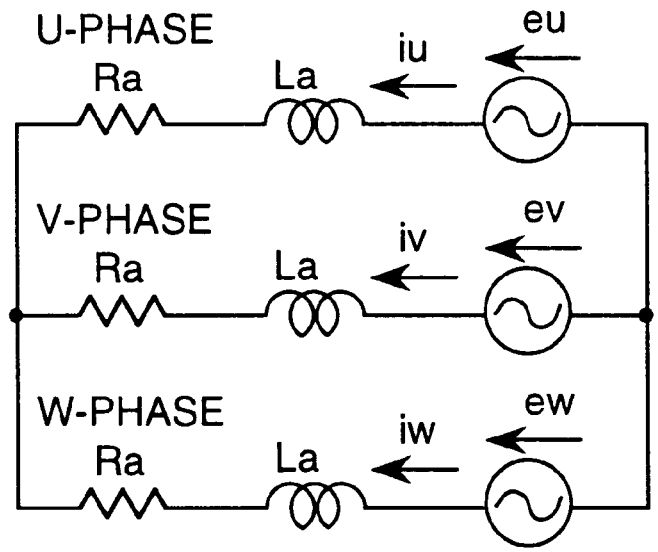
FIGS. 11(a) and (b) are diagrams explaining a motor equivalent circuit of FIG. 10.
Figure 11:
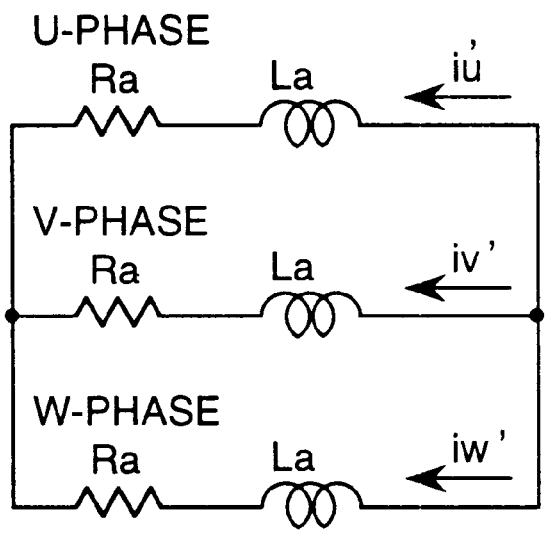
Figure 12:
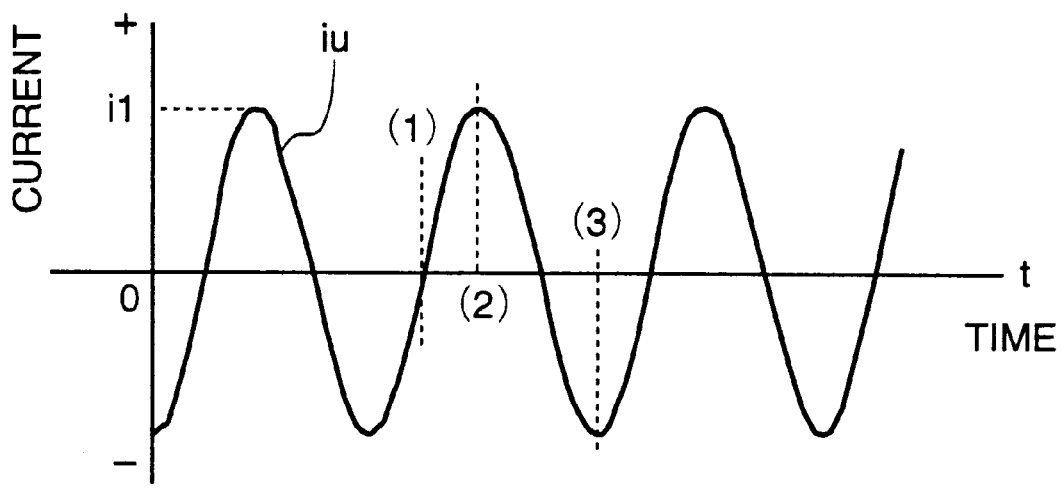
FIGS. 12(a) and (b) are charts explaining motor current time characteristics at the short circuit control.
Figure 12:
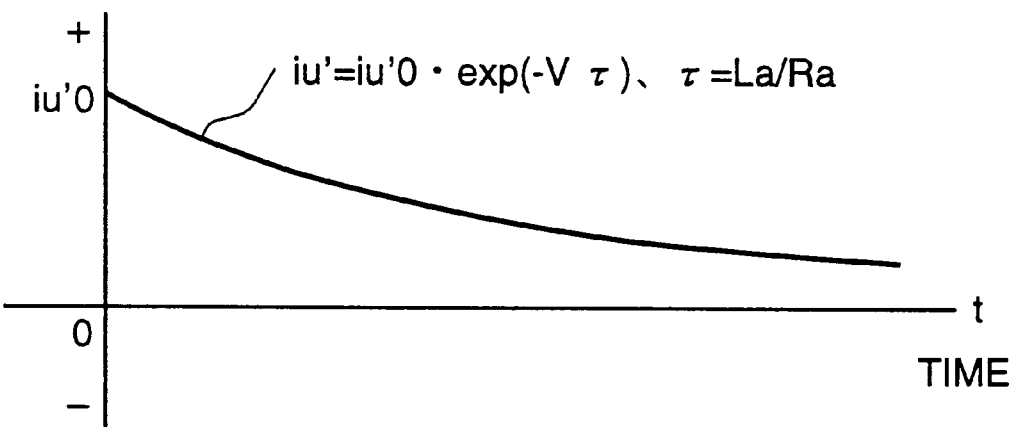

By holding the circuit in the state shown in FIG. 3 (a) for the required time period T1 in prior to transition of the 3-phase short circuit, a pulse voltage VPU having an amplitude of corresponding to the capacitor voltage Vc and a width of T1 can be applied to the U-phase, as shown in FIG. 6. Therefore, according to the theorem of "an electric circuit superposing theorem", the current flowing in each of the phases can be expressed by the sum of the steady-state current component by the induction voltage of the motor 1, the compensating current component by the pulse voltage VPU generated in the operation of FIG. 3 (a) and the 3-phase short circuit transient current component. That is, the current flowing in each of the phases can be expressed by the sum of the steady-state current component shown in FIG. 11, the 3-phase short circuit transient current component and the compensating current component shown in FIG. 6. Therefore, a flow of large current is prevented by canceling the 3-phase short circuit transient current component by the compensating current component.

It can be understood from FIG. 6 that in a case where the circuit constant in each phase is the same, the compensating currents of the V-phase and the W-phase flowing by the pulse voltage VUP become the same value. Therefore, in order to compensate the 3-phase short circuit transient current component in the present embodiment, it is a necessary condition that the 3-phase short circuit transient current components of the V-phase and the W-phase are equal to each other.

Therein, an important point in the series of the operation is the method of determining the time t0 to start the control and the required time period T1. The time t0 sets a timing of the induced voltage when an absolute value of the steady-state current becomes maximum. In detail, it is the time point (3) in FIG. 4 when the steady-state current of the U-phase becomes the maximum value. At that time point, the above-mentioned condition is satisfied because both steady-state currents of the V-phase and the W-phase are equal to each other and ½ of the U-phase current, though the sign is reversed. The details will be described below, referring to FIG. 8.

Figure 8:
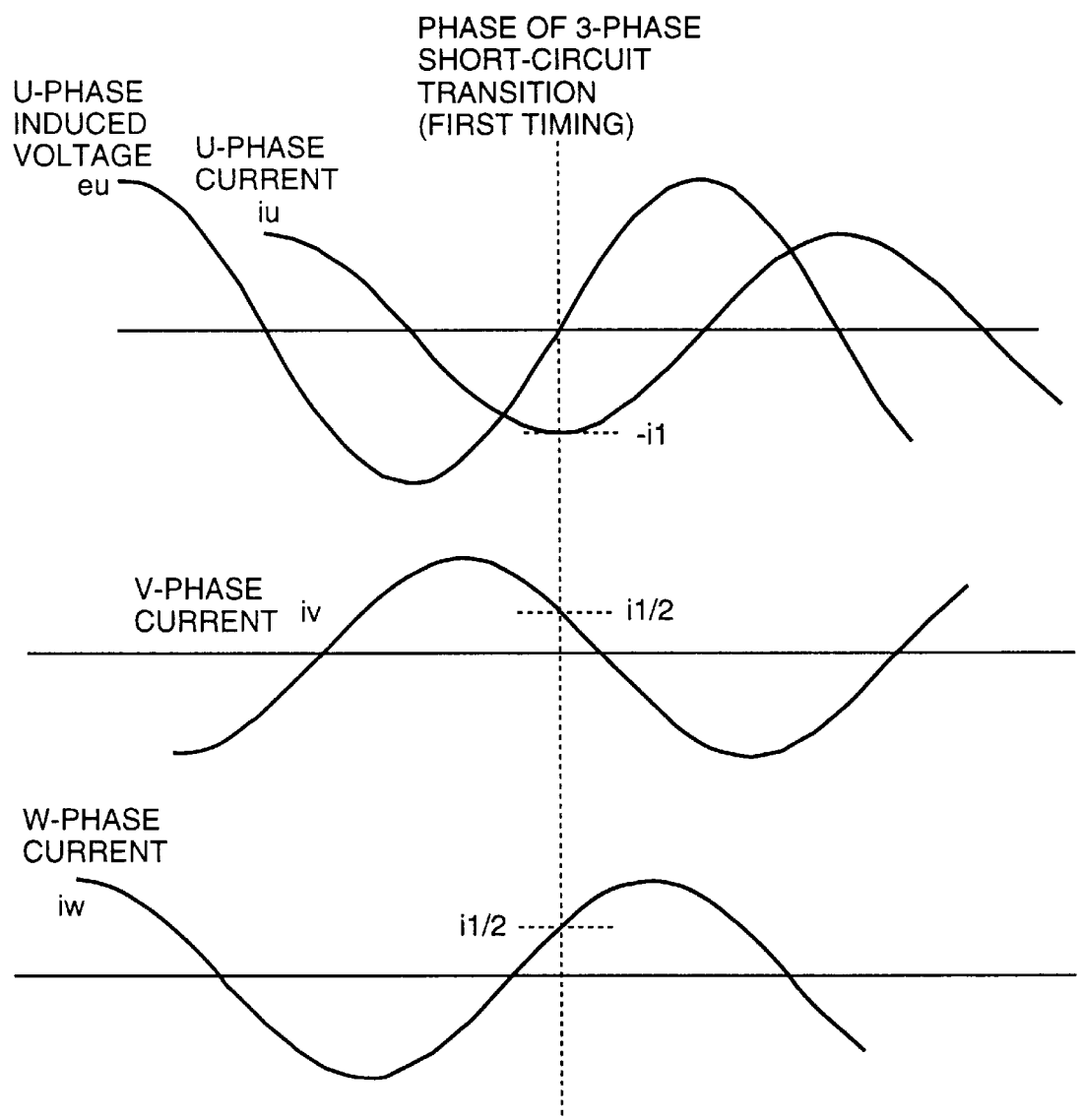
FIG. 8 is a chart showing a first timing in an embodiment according to the present invention.

Since the 3-phase short circuit transient current component varies depending on the phase at the time of starting the 3-phase short circuit, the first timing applying the pulse voltage is set as follows. FIG. 8 is a chart showing the first timing in an embodiment according to the present invention.

In FIG. 8, the steady-state current components of the U-phase, the V-phase and the W-phase are shown. The steady-state current components (iu, iv, iw) have the same amplitude i1 and the phases are different from each other by 120°. The induced voltage (only eu is shown in the figure) is generated by varying the magnetic flux of the permanent magnet intersecting with a stator winding of the permanent magnet synchronous motor, and the phase of the induced voltage can be calculated from a magnetic pole position detected, for example, by the magnetic pole detecting means existing in the permanent magnet synchronous motor. The phase difference between the induced voltage and the current is nearly 90° since it is assumed here that the motor current is in a high frequency range.

In the phase at the time point shown by a vertical dotted line in FIG. 8, the amplitudes (i1/2) of the V-phase current and the W-phase current are equal to each other, and the sign is reversed to and the amplitude is one-half of the amplitude (−i1) of the U-phase current. If the ordinary 3-phase short circuit is started at the time point, the initial value of the 3-phase short circuit transient current in the U-phase becomes "i1", and the initial values of the 3-phase short circuit transient currents in the V-phase and the W-phase become "−i1/2".

Figure 7:
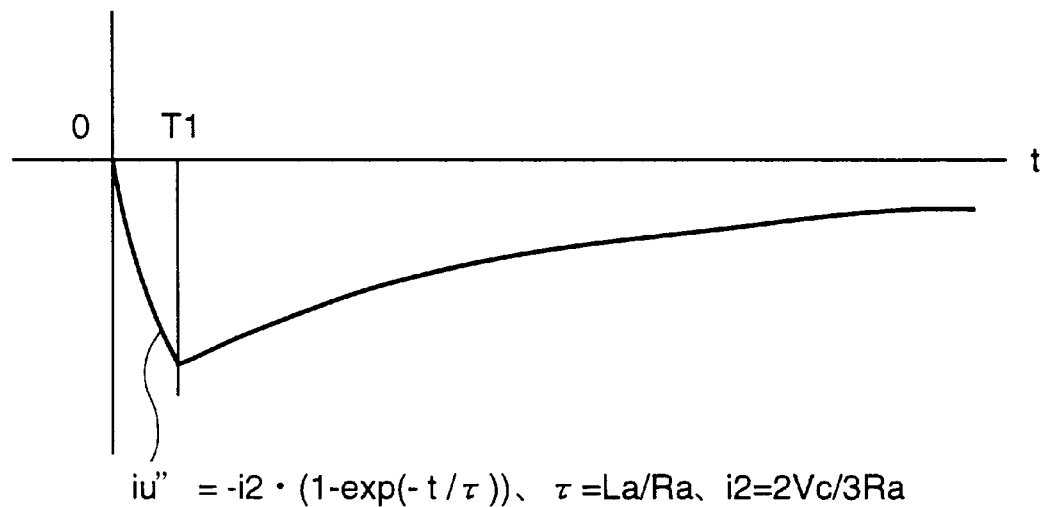
FIG. 7 is a chart showing motor current time characteristics in the case of FIG. 5.

A method of determining the required time period T1 will be described, referring to FIG. 6 and FIG. 7. As described above, FIG. 6 is an equivalent circuit which determines a compensating current component flowing in each phase by the pulse voltage VUP in the case of performing the control shown in FIG. 3 (a). The compensating current component iu″ flowing in the U-phase by the pulse voltage VUP has a wave-form as shown in FIG. 7. The compensating current component iu″ in the U-phase during the required time period T1 from generation of the pulse voltage is increased in the negative direction according to the following equations (3), (4).

$$iu''=-i2\{1-exp(-t/\tau)\} \quad (3)$$

$$i2=2Vc/(3Ra) \quad (4)$$

where the time constant can be expressed by $\tau=La/Ra$. The compensating current component iv″ in the V-phase and the compensating current component iw″ in the W-phase become as follows.

$$iv''=iw''=-iu''/2.$$

Since there exists a time point where the compensating current component iu″ in the U-phase agrees with the absolute value of the 3-phase short circuit transient current component iu′ flowing in the U-phase, the required time period T1 is determined using the equation (3) so that both values agree with each other. When the time constant $\tau$ is large, the required time period T1 may be determined by a linear approximation. An example of a detailed method of determining the required time period T1 will be described below.

For the case where the switching elements 20, 23, 25 are turned on at a time, the first timing as the certain time point is an inflection point where a derivative di/dt of the steady-state current component changes from a negative value to a positive value when it is expressed by the current in the U-phase.

In a case where the switching elements 21, 22, 24 are turned on at a time, the first timing is an inflection point where a derivative di/dt of the steady-state current component changes from a positive value to a negative value. The inflection point can be calculated from the phase position detected by the magnetic pole position detecting means in advance.

Figure 4:
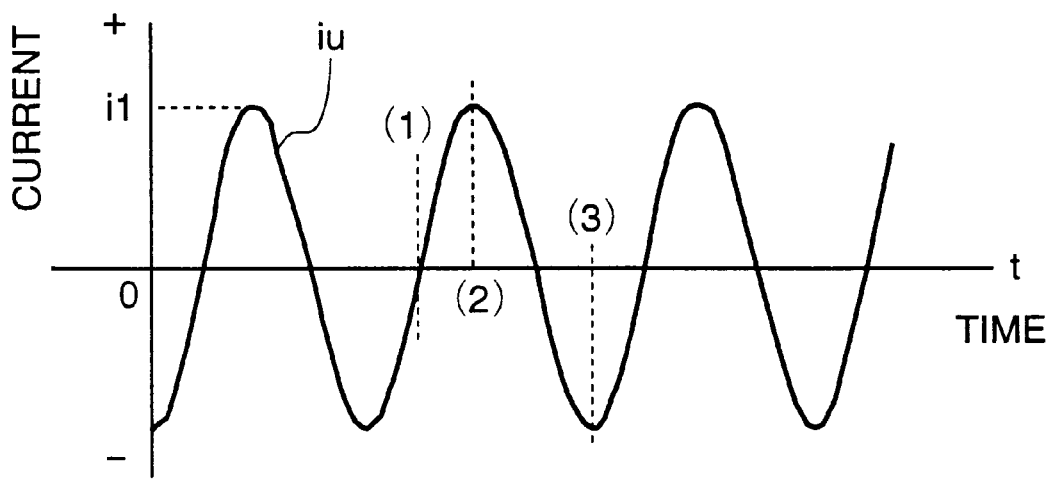
FIGS. 4(a) and (b) are charts explaining motor current time characteristics at the short circuit control.
Figure 4:
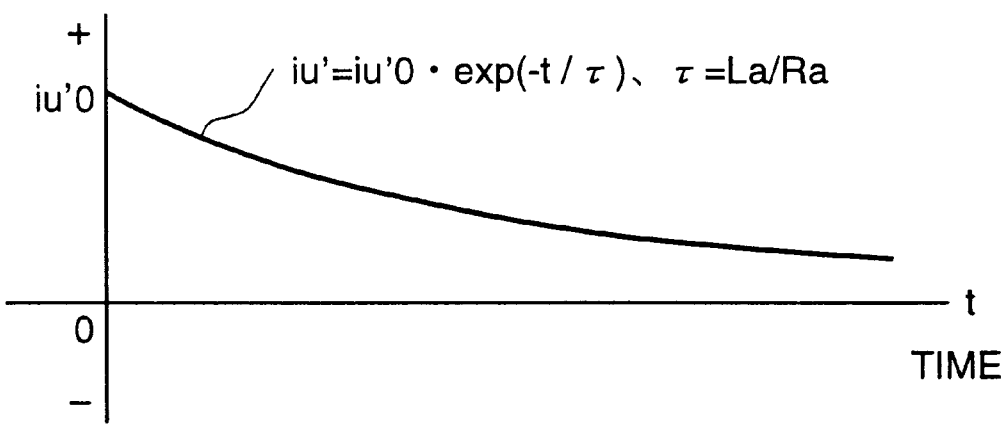
Figure 5:
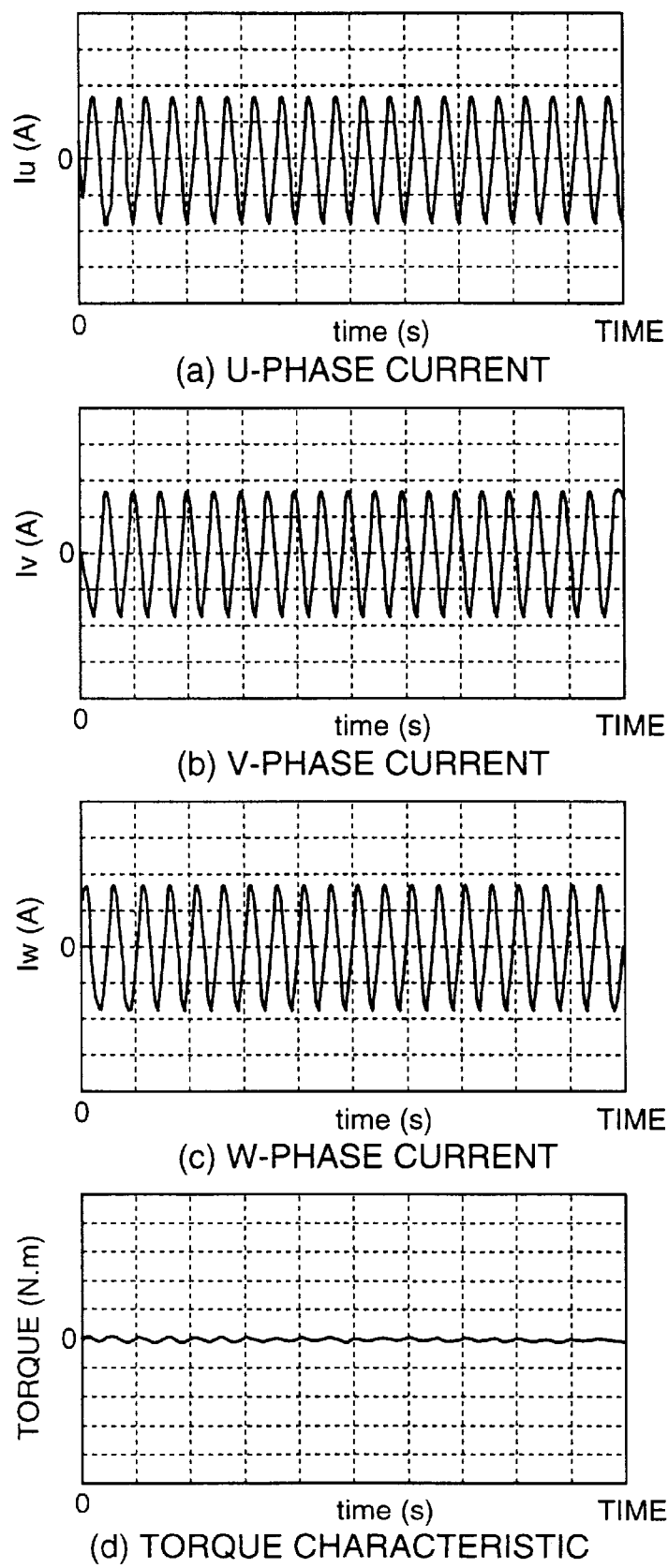
FIGS. 5(a) and (d) are charts showing motor currents and motor torque characteristics in a case where precursory on-off control is performed and then 3-phase short circuit control is performed in the embodiment of FIG. 1.

On the other hand, the required time period T1 for applying the pulse voltage of the capacitor is a time period in which the sum of the 3-phase short circuit transient current component iu′ (the initial value is i1) shown in FIG. 4 (b) and the current iu″ by the pulse voltage shown in FIG. 7 becomes 0 (zero). Therefore, the time period calculated from the equations becomes as follows.

$$T1=-\tau\cdot ln(i2/(i2+i1)) \quad (5)$$

Since the value i2 is a function of a capacitor voltage, it is necessary to calculate the required time period T1 based on the capacitor voltage. Since it takes a certain amount of processing time to calculate the required time period T1, for example, by a microcomputer, it is preferable to use a table by forming the pre-calculated table of the required time periods T1 corresponding to the capacitor voltages in advance. That is, another characteristic of the present invention is in that the required time period T1 is varied depending on the magnitude of voltage of the smoothing capacitor. In other words, another characteristic of the present invention is that a voltage of the smoothing capacitor is detected and a means for calculating a required time period T1 is provided.

Further, although the shift in the current cannot be corrected 100%, by fixing the required time period to an "appropriate value" it is possible to protect the switching elements (for example, IGBT) from breaking caused by an over current.

Further, although in the present embodiment the first timing is accurately set, it is difficult to accurately detect the phase of the time point shown in FIG. 8 using a sampling process of a microcomputer when the motor is rotated at a high speed. Since the required time period T1 is a time width having a certain length, a similar effect can be attained by providing the first timing with an allowance of a time width of nearly the required time period before and after the phase as the time point shown in FIG. 8, in other words, by employing a time point within the range of certain zones set before and after the inflection point, for example, within the range of zones having a time width of T1 equal to the required time period T1 in the inflection point as the first timing. Furthermore, it has been confirmed that there is an effect to protect IGBT as the switching elements from breakage caused by over current even by employing a time point within the range of zones having a time width (2T1) nearly twice as wide as the required time period T1 before and after the inflection point as the first timing. Incidentally, the required time period T1 in the present embodiment is nearly 150 μsec.

When the switching elements are switched at the certain time point t1 calculated from the capacitor voltage Vc and so on as shown in FIG. 3 (a), the pulse voltage V becomes 0 (zero) after the required time period T1 elapses. Therefore, the compensating current components iu", iv", iw" for the individual phases are gradually decreased to 0 (zero) with the time constant τ as shown in FIG. 7. If the absolute values of the compensating current component iu" of the U-phase and the 3-phase short circuit transient current component iu' flowing in the U-phase are equal to each other at a time after elapsing the required time period T1, the wave-form at a time after elapsing the required time period T1 of FIG. 7 becomes the same as the wave-form of the 3-phase short circuit transient current component of FIG. 4 (b) though the sign is different. That is, the required time period T1 is determined so that the absolute values of the compensating current component iu" of the U-phase and the 3-phase short circuit transient current component iu' flowing in the U-phase are equal to each other at a time after the required time period T1, elapses the 3-phase short circuit transient current components for the individual phases can be canceled by the compensating current components for the individual phases. Consequently, only the steady-state current components of FIG. 4 (a) flow.

On the contrary, it can be also considered that the switching element 21 in the other side and the switching elements 22, 24 on the one side are turned on at a certain time. In this case, the first timing (phase) for turning on differs from the first timing in the case of turning on the switching elements 20, 23, 25 described above by 180°.

Then, after the required time period, alapses the control is transited to the 3-phase short circuit by turning off the switching elements 22, 24 in the one side and turning off the switching elements 23, 25 in the other side. During this time, the current from the capacitor 3 flows from the switching elements 22, 24 to the switching element 21 through the motor 1.

Further, it can be considered that after turning on the switching elements 20, 23, 25 at a certain time, or after turning on the switching elements 21, 22, 24 at a certain time, the switching elements 20, 22, 24 in the one side are 3-phase short circuited.

Then, for the case where the largest transient current component will flow in the V-phase and is to be canceled, a similar method as for the U-phase case can be considered. In the method, the switching elements 21, 22, 25 are turned on at a certain time, and after the required time period elapses, the control is transited to the 3-phase short circuit by turning off the switching element 22 and turning on the switching element 23. In the case where the largest transient current component will flow in the W-phase and is to be canceled, a similar method as for the U-phase case can be considered. In the method, the switching elements 21, 23, 24 are turned on at a certain time, and after the required time period elapses, the control is transited to the 3-phase short circuit by turning off the switching element 24 and turning on the switching element 25.

As described above, the ON-OFF operation of the switching elements can be arbitrarily selected in connection with the induced voltages. Therefore, in a case where the motor control is restarted by the inverter from a state in which the motor 1 is being rotated in a free running state, it is preferable that the 3-phase ON-OFF state of the switching elements be selected from the above-mentioned switching methods depending on an induction voltage state in order to prevent flowing of a large current in a product requiring to shortening the time until restarting.

Figure 10:
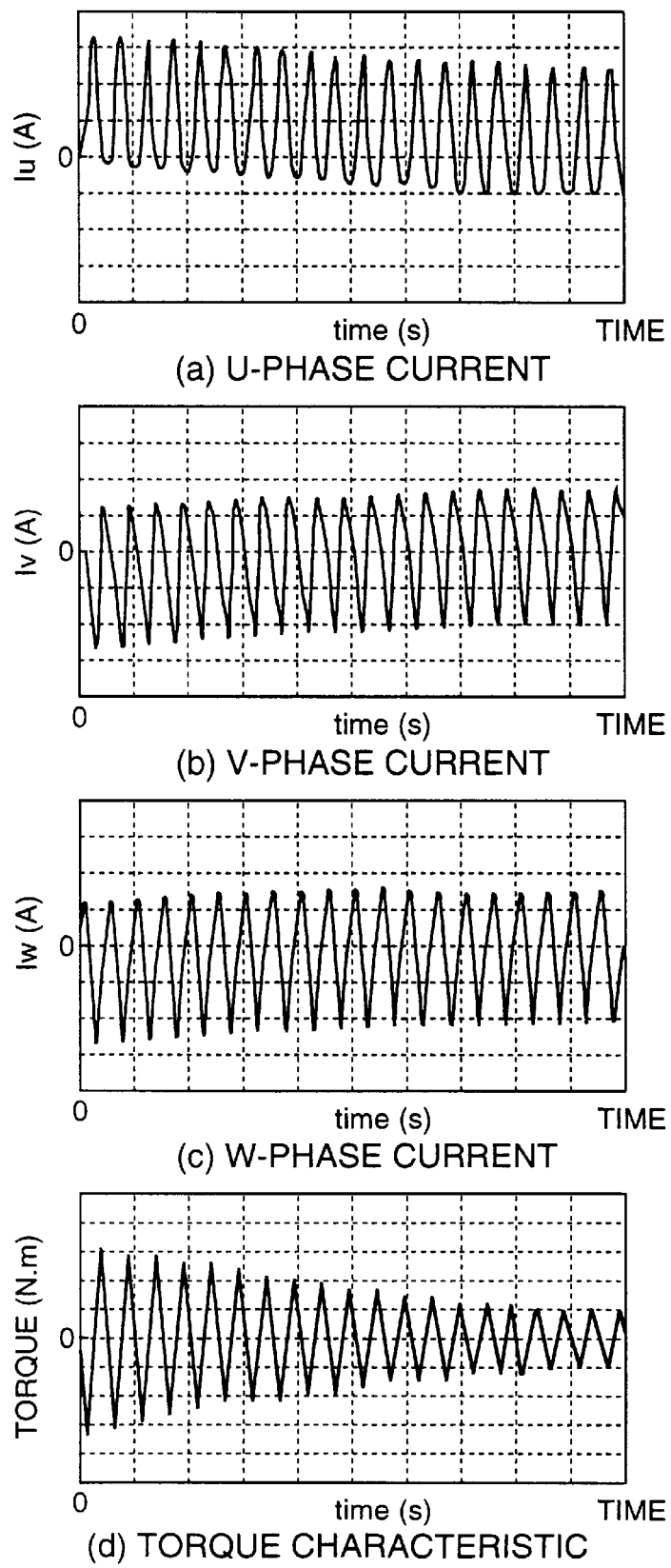
FIGS. 10 (a)–(d) are charts explaining motor currents and motor torque when 3-phase short circuit is performed in a conventional system.

Further, in a case of a product in which there is no problem to take several tens ms to several hundreds ms in restarting of the motor control, the switching method may be pre-determined as shown in FIG. 10. In that case, it is possible that a timing where the steady-state current component of the U-phase becomes the maximum in negative value is determined from the induced voltage of the U-phase and the control is started by setting the time as 0.

The above is the description on the precursory control of 3-phase short circuit in accordance with the present invention to prevent flowing of a large current in the switching elements.

The controller in accordance with the present invention comprises the short circuit transition means for executing the precursory ON-OFF control of each of the switching elements and transiting to the 3-phase short circuit in order to avoid over current generated in the initial stage if performing the 3-phase short circuit of the motor 1 in a rotating state, that is, comprises the constructing means of the short circuit transition process portion 13, or the constructing means of the short circuit transition process portion 13, the voltage command switching portion 14, the carrier wave comparison portion 15 and the PWM signal output permission portion 16. The present invention enables the introduce of the 3-phase short circuit control of the motor in a rotating state, and to avoid the occurrence of an over current without switching elements and a contactor having a large maximum allowable current. Therefore, there results a reduction of the cost and an improvement of the reliability.

FIGS. 5(a)–(d) are charts showing motor currents and motor torque characteristics for the control of the present embodiment shown in FIG. 1. The maximum current flowing in each of the phases in FIG. 5 is reduced to one-half compared to the characteristics of FIG. 3 (a) where the conventional 3-phase short circuit control is performed. Any current of the three phases is not shifted either to the positive side nor the negative side, and only the sinusoidal steady state current component flows from the time just after the starting of the control. That is, this shows that the 3-phase short circuit transient current component is canceled by the compensating current component. Further, a transient motor torque fluctuation is not produced either.

Description will be made below on a method of transiting to the 3-phase short circuit by outputting a pulse voltage using the capacitor by carrier wave comparison.

FIGS. 9(a) and (b) are charts showing an embodiment of a method of applying a capacitor voltage by carrier wave comparison in accordance with the present invention. That is, the figure shows an embodiment of the short circuit transition means outputting a pulse voltage by making use of a function to output the PWM signals by a counter contained in the microcomputer. The short circuit transition means of this embodiment includes the short circuit transition process portion 13, the voltage command switching portion 14, the carrier wave comparison portion 15 and the PWM signal output permission portion 16. The method of transiting to the 3-phase short circuit will be described below.

Figure 9:
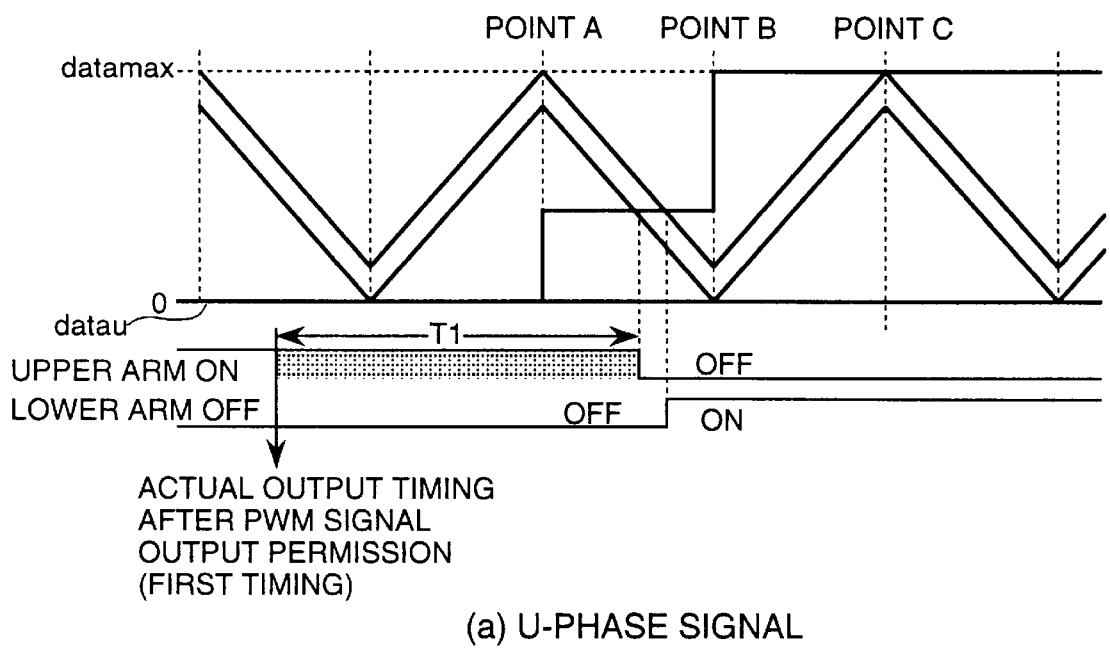
FIGS. 9(a) and (b) are charts showing an embodiment of a method of applying capacitor voltage by carrier wave comparison in accordance with the present invention.
Figure 9:
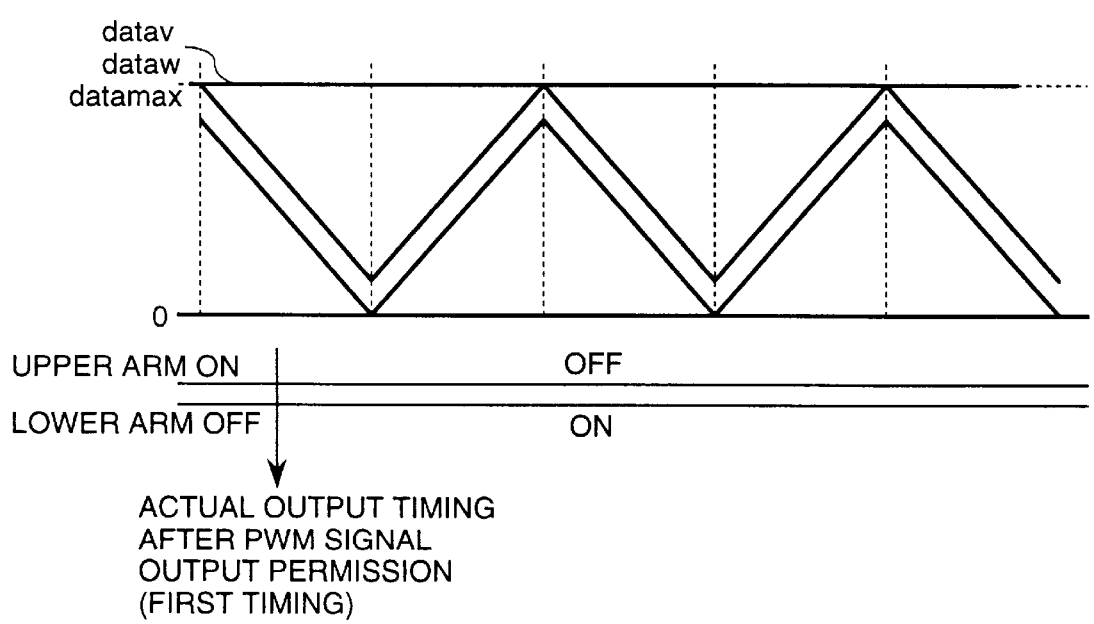

Referring to FIG. 9, there are provided two counters which generate signals which repeat up-and-down between 0 (zero) and datamax by a counting clock, and voltage command values datau, datav and dataw of the U-phase, the V-phase and the W-phase are set to dedicated registers. By comparing the magnitudes of the values in the counters and the registers, six PWM signals for driving the switching elements of the U-phase, the V-phase and the W-phase can be automatically output. By comparing the values of the two counters, a short circuit preventing time between the switching elements in the upper arm and the lower arm is formed. In performing current control, the voltage command values obtained from the calculation of the current control portion are set to the registers, PWM signals are output, and the motor is driven by operating the inverter using the PWM signals.

In a case of transiting the 3-phase short circuit by making use of this function, in regard to the U-phase, the voltage command value datau is set to 0 (zero) to set the upper arm signal to ON and the lower arm signal to OFF prior to output permission of the PWM signal, as shown in FIG. 9 (a). When PWM signal output is permitted, the upper arm signal performs ON-OFF operation of the switching element 20 of FIG. 1, and the lower arm signal performs ON-OFF operation of the switching element 21 of FIG. 1.

In regard to the V-phase and the W-phase, the voltage command values datav and dataw are set to the value of datamax to set the upper arm signal to OFF and the lower arm signal to ON prior to output permission of the PWM signal, as shown in FIG. 9 (b). When PWM signal output is permitted, the upper arm signal performs ON-OFF operation of the switching elements 22, 24 of FIG. 1, and the lower arm signal performs ON-OFF operation of the switching elements 23, 25 of FIG. 1.

Next, a magnetic pole position of the permanent magnet synchronous motor is judged at the phase (the first timing) shown by the dotted line in FIG. 8 so that the pulse voltage can be output from the capacitor, that is, so that the PWM signal output permission can be performed. This judgment process is a process, not shown, repeating so as to start every one cycle or every half cycle of the counter in synchronism with the value of the counter of FIG. 9. When it is judged in the above-mentioned judgment that the magnetic pole position of the permanent magnet synchronous motor is in the phase (the first timing) shown by the dotted line in FIG. 8, the PWM signal output permission is performed. When the PWM signal output permission is performed, the preset upper arm signals and the preset lower arm signals of the U-phase, the V-phase and the W-phase are respectively transmitted to the switching elements to turn the switching elements 20, 23, 25 to the ON state and to keep the switching elements 21, 22, 24 in the OFF state. Therein, during prohibiting of the PWM signal output, all the switching elements are kept in the OFF state.

The above-mentioned state is a state where the pulse voltage is applied using the electric power from the capacitor 3. After applying the pulse voltage for the required time period T1, it is necessary to switch the switching element 20 to the OFF state and the switching element 21 to the OFF state. In FIG. 9 (a), a required time period T1 corresponding to the capacitor voltage is calculated in advance, and the voltage command value datau is varied so that the applied time period of the pulse voltage becomes the required time period T1. This process is also performed as part of the process repeating so as to start every one cycle or every half cycle of the counter in synchronism with the value of the counter to vary the voltage command value datau between the point A and the point B.

By estimating the time from permission of the PWM signal output to the point A in advance, the voltage at the point A is calculated so as to finally become the required time period of the pulse voltage. At the point B, the control is transited to the 3-phase short circuit by setting the voltage command value datau to the value datamax and by setting the upper arm signal to OFF and the lower arm signal to OFF, that is, by turning on the switching element 20 and turning off the switching element 21.

There are some cases where the voltage command value datau is set to a value between 0 (zero) and datamax at the point B depending on the magnitude of the required time period T1 instead of varying the voltage command value at the point A. In that case, the ON signal of the upper arm once becomes the OFF signal at the point B, and then again becomes the On signal at the time when the voltage command value datau and the counter value agree with each other, and finally becomes the OFF signal at the point C to change the control to the 3-phase short circuit. Even in such a case wherein the capacitor voltage is applied by dividing two times (the total time period is equal to the required time period T1), it is possible to attain the same characteristic as in the case of applying a pulse voltage having a continuous time period of T1.

It is effective to prevent over current by adding the capacitor voltage as the PWM signal as described above to compensate the current shift at the starting of the 3-phase short circuit. Although the above process has been described in conjunction with the case where the pulse voltage is applied to the U-phase, the process can be applied to cases where the pulse voltage is applied to the V-phase or the W-phase. In other words, a further characteristic of the present invention is that the control unit 11 performs the ON-OFF control using a PWM method, and the short circuit transition means is also used as the PWM method to the precursory ON-OFF control performed by the short circuit transition means in order to simplify the construction.

In the above-mentioned explanation, it is assumed that the largest transient current flows in one phase (for example, the U-phase) at the 3-phase short circuit, and the optimum timing to apply the pulse voltage with respect to the one phase is judged from, for example, the magnetic pole position. On the other hand, another method can be considered. The method will be described below.

For example, by providing a "phase selecting means" for selecting a phase flowing the largest transient current using a magnetic pole position detected by the magnetic pole position detecting means mounted in the permanent magnet synchronous motor, the 3-phase short circuit can be instantaneously started to the selected phase among the U-phase, the V-phase and the W-phase. Therefore, there is an advantage in that the 3-phase short circuit transition process can be started certainly and in a short time compared to the case of waiting for the optimum phase (the certain time point) in only one phase.

Then, charge accumulated in the smoothing capacitor is applied to the selected phase for a required time period as described above, and by providing a "canceling control means" for controlling so as to cancel the transient current component, it is possible to prevent over current generated at the 3-phase short circuit. This method is suitable for an electric vehicle controller of an electric vehicle in which safety is important.

A further characteristic of the present invention is that an electric vehicle controller comprises a phase selecting means for selecting a phase of a switching element in which a transient current component generated by induced voltage of a rotating three-phase permanent magnet synchronous motor when switching control (ON-OFF control) of the permanent magnet synchronous motor is suddenly stopped; and a canceling control means for controlling so as to cancel the transient current component by applying charge accumulated in the smoothing capacitor to the selected phase for a required time period.

On the other hand, returning to FIG. 1, since the induced voltage of the motor 1 is not produced in the input side of the inverter 2 while the 3-phase short circuit is being performed, over current does not flow in the resistor 9 or the connecting circuit even making the auxiliary relay 8 and the main relay 7.

Further, the 3-phase short circuit produces braking torque in the permanent magnet synchronous motor to reduce the motor speed. After making the main relay 7, if the motor speed is within a range controllable by the current control portion 12, the process of the short circuit transition portion 13 is stopped and the process of the current control portion 12 is restarted, and the resultant voltage command values obtained from the current control portion 12 are compared with the carrier wave to output to the gate portions of the inverter as the PWM signals.

Further, the present invention can be applied to an electric vehicle controller (a controller for controlling a permanent magnet synchronous motor used for driving an electric vehicle) which may become incapable of controlling the motor due to over speed of the electric vehicle on a descending load or which may be required to restart the motor control by turning on the key switch from a state where the control is kept to be completely stopped by turning off the key switch while the electric vehicle is running. Particularly, the present invention is effective for securing safety for the case where a driver erroneously suddenly stops the ON-OFF control of the electric vehicle controller.

Furthermore, by performing the 3-phase short circuit of the permanent magnet synchronous motor using switching elements of the inverter, the speed of the vehicle can be decreased by making the relay circuit or by braking action. It is also possible to stop the 3-phase short circuit and start motor control when the speed of the vehicle is decreased.

This method can be applied to a case where a direct current power source such as a converter or the like is used instead of the battery.

What is claimed is:

1. A permanent magnet synchronous motor controller comprising an inverter for supplying an alternating current power converted from a direct current power to a 3-phase permanent magnet synchronous motor through switching elements provided for each of phases; a smoothing capacitor for smoothing said direct current power supplied to said inverter; and a control unit for controlling said inverter by performing ON-OFF control of each of said switching elements, wherein said control unit comprises a short circuit transition means for performing precursory ON-OFF control of each of said switching elements prior to performing ON-OFF control of a 3-phase short circuit by said control unit during rotation of said permanent magnet synchronous motor and then performing said 3-phase short circuit.

2. A permanent magnet synchronous motor controller according to claim 1, wherein said inverter is constructed in a 3-phase bridge by at least six of said switching elements, and said short circuit transition means turns on at least two phases of the switching elements connected to a positive pole side of a direct current power source for supplying said direct current power to said inverter and the other phases of the elements connected to a negative pole side of said direct current power source at a certain timing determined at a state of the motor when all of said switching elements are in an OFF state, and then performs the 3-phase short circuit by switching the ON-OFF states of said switching elements after a required time period for suppressing a transient current.

3. A permanent magnet synchronous motor controller according to claim 1, which comprises:
   a make-and-break means for making and braking an electric connection between said inverter and a direct current power source for supplying said direct current power to said inverter; and
   a make-and-break control means for making said make-and-break means after completion of said transition of the 3-phase short circuit by said short circuit transition means.

4. A permanent magnet synchronous motor controller according to claim 1, wherein said control unit performs said precursory ON-OFF control executed by said short circuit transition means by a PWM method.

5. A permanent magnet synchronous motor controller according to claim 2, wherein said certain timing is a time point in an inflection point and the vicinity where a derivative di/dt of a steady-state current component with respect to time during rotation of said permanent magnet synchronous motor changes from a negative value to a positive value and vice versa.

6. A permanent magnet synchronous motor controller according to claim 2, wherein said required time period is a time period T1 obtained from the following equation (5):

$$T1 = -\tau \cdot ln\{i2/(i2+i1)\}, \quad (5)$$

wherein $\tau$ is a decay time constant of a transient current component during performing the 3-phase short circuit, i1 is an amplitude of a steady-state current component during performing the 3-phase short circuit, i2 is a final value of current flowing by a voltage of the smoothing capacitor and ln is a natural logarithm.

7. A permanent magnet synchronous motor controller according to claim 2, wherein said required time period is varied depending on a magnitude of a voltage of said smoothing capacitor.

8. A permanent magnet synchronous motor controller according to claim 2, wherein said inflection point is determined by a magnetic pole position of said permanent magnet synchronous motor.

9. A permanent magnet synchronous motor controller for switching a three-phase permanent magnet synchronous motor in rotating from a free run state to a driven state by an inverter, wherein switching control for canceling out transient current is accompanied by 3-phase short circuit by said inverter from a certain time point determined by a magnetic pole position of said permanent magnet synchronous motor.

10. An electric vehicle controller for controlling a permanent magnet synchronous motor for driving an electric vehicle using a permanent magnet synchronous motor controller comprising an inverter for supplying an alternating current power converted from a direct current power to a 3-phase permanent magnet synchronous motor through switching elements provided for each of phases; a smoothing capacitor for smoothing said direct current power supplied to said inverter; and a control unit for controlling said inverter by performing ON-OFF control of each of said switching elements, wherein said control unit comprises a short circuit transition means for performing precursory ON-OFF control of each of said switching elements prior to performing ON-OFF control of a 3phase short circuit by said control unit during rotation of said permanent magnet synchronous motor and then performing said 3-phase short circuit.

11. An electric vehicle controller according to claim 10, wherein said inverter is constructed in a 3-phase bridge by at least six of said switching elements, and said short circuit transition means turns on at least two phases of the switching elements connected to a positive pole side of a direct current power source for supplying said direct current power to said inverter and the other phases of the elements connected to a negative pole side of said direct current power source at a certain timing determined at a state of the motor when all of said switching elements are in an OFF state, and then performs the 3-phase short circuit by switching the ON-OFF states of said switching elements after a required time period for suppressing a transient current.

12. An electric vehicle controller according to claim 10, which comprises:

a make-and-break means for making and braking an electric connection between said inverter and a direct current power source for supplying said direct current power to said inverter; and a make-and-break control means for making said make-and-break means after completion of said transition of the 3-phase short circuit by said short circuit transition means.

13. An electric vehicle controller according to claim 10, wherein said control unit performs said precursory ON-OFF control executed by said short circuit transition means by a PWM method.

14. An electric vehicle controller for controlling a permanent magnet synchronous motor for driving an electric vehicle using a permanent magnet synchronous motor controller for switching a three-phase permanent magnet synchronous motor in rotating from a free run state to a driven state by an inverter, wherein switching control for canceling out transient current is accompanied by 3-phase short circuit by said inverter from a certain time point determined by a magnetic pole position of said permanent magnet synchronous motor.

* * * * *